United States Patent [19]
Lin et al.

[11] Patent Number: 6,079,800
[45] Date of Patent: Jun. 27, 2000

[54] ACTIVE BRAKE CONTROL WITH FRONT-TO-REAR PROPORTIONING

[75] Inventors: William Chin-Woei Lin, Troy; Youssef Ahmed Ghoneim, Macomb Township, Macomb County; David Michael Sidlosky, Huntington Woods; Yuen-Kwok Chin, Troy, all of Mich.

[73] Assignee: General Motors Corporation, Detroit, Mich.

[21] Appl. No.: 09/136,947

[22] Filed: Aug. 20, 1998

[51] Int. Cl.⁷ ...................................................... B60T 8/32
[52] U.S. Cl. ........................ 303/146; 303/147; 303/140; 701/72
[58] Field of Search .................. 701/72, 48; 188/181 C; 303/146, 147, 140, 169, 171

[56] References Cited

U.S. PATENT DOCUMENTS

| | | | |
|---|---|---|---|
| 4,834,205 | 5/1989 | Mizuno et al. | 180/141 |
| 5,063,514 | 11/1991 | Headley et al. | 364/426.02 |
| 5,172,961 | 12/1992 | Inoue et al. | 303/100 |
| 5,229,944 | 7/1993 | Yasuno | 364/426.01 |
| 5,275,475 | 1/1994 | Hartmann et al. | 303/103 |
| 5,311,431 | 5/1994 | Cao et al. | 364/424.05 |
| 5,332,300 | 7/1994 | Hartmann et al. | 303/146 |
| 5,341,297 | 8/1994 | Zomotor et al. | 364/426.03 |
| 5,366,281 | 11/1994 | Littlejohn | 303/3 |
| 5,402,342 | 3/1995 | Ehret et al. | 364/424.05 |
| 5,444,621 | 8/1995 | Matsunaga et al. | 364/424.05 |
| 5,480,219 | 1/1996 | Kost et al. | 303/146 |
| 5,667,286 | 9/1997 | Hoying et al. | 303/140 |
| 5,707,120 | 1/1998 | Monzaki et al. | 303/146 |
| 5,709,439 | 1/1998 | Monzaki | 303/146 |
| 5,720,533 | 2/1998 | Pastor et al. | 303/147 |
| 5,727,853 | 3/1998 | Monzaki | 303/146 |
| 5,746,486 | 5/1998 | Paul et al. | 303/146 |
| 5,782,543 | 7/1998 | Monzaki et al. | 303/146 |
| 5,839,799 | 11/1998 | Fukada | 303/146 |
| 5,931,887 | 8/1999 | Hac | 303/140 |

FOREIGN PATENT DOCUMENTS

| | | |
|---|---|---|
| 0 555 860 A1 | 8/1993 | European Pat. Off. . |
| 41 23 235 C1 | 11/1992 | Germany . |
| 41 21 954 A1 | 1/1993 | Germany . |
| 42 00 061 A1 | 7/1993 | Germany . |
| 42 23 385 A1 | 1/1994 | Germany . |
| 42 29 504 A1 | 3/1994 | Germany . |
| 43 11 077 A1 | 10/1994 | Germany . |
| 43 14 827 A1 | 11/1994 | Germany . |

(List continued on next page.)

OTHER PUBLICATIONS

May the Cornering Force be with You; Popular Mechanics; Dec. 1995, pp. 74–77.
Stable as She Goes: Don Sherman, Automotive Industries, May 1995.
The Spin Doctors: Don Sherman, 12PS95.

(List continued on next page.)

*Primary Examiner*—Robert J. Oberleitner
*Assistant Examiner*—Devon Kramer
*Attorney, Agent, or Firm*—Anthony Luke Simon

[57] ABSTRACT

An improved active brake control for carrying out a desired wheel speed differential for enhanced vehicle lateral stability while maintaining suitable front-to-rear brake pressure proportioning. During driver braking, the target speeds for the wheels of the driven axle during active brake control are determined as a combined function of the wheel speeds of the un-driven axle and the desired wheel speed differential. Specifically, the target speeds for the driven wheels are determined according to the measured speeds of the corresponding un-driven wheels, and one of the target speeds is reduced to reflect the desired wheel speed differential. If the desired wheel speed differential is designed to produce a clockwise yaw moment, the target speed for the driven wheel on the right-hand side of the vehicle is reduced; if the differential is designed to produce a counter-clockwise yaw moment, the target speed for the driven wheel on the left-hand side of the vehicle is reduced. As a result of the control, the stability enhancing effect of the ABC is achieved without disturbing the ideal front-to-rear brake effort proportioning.

7 Claims, 4 Drawing Sheets

FOREIGN PATENT DOCUMENTS

| | | |
|---|---|---|
| 40 52 62213 | 10/1993 | Japan . |
| 40 60 24304 | 2/1994 | Japan . |
| 40 60 87421 | 3/1994 | Japan . |
| 40 61 15418 | 4/1994 | Japan . |
| 40 61 27354 | 5/1994 | Japan . |
| 2 275 551 | 1/1993 | United Kingdom . |
| 2 263 340 | 7/1993 | United Kingdom . |
| 2 269 571 | 2/1994 | United Kingdom . |
| 2 275 312 | 8/1994 | United Kingdom . |

OTHER PUBLICATIONS

Mercedes/Bosch Esp; Automotive Industries, Apr. 1995.

Controlling Vehicle Stability; Christopher A. Sawyer, Automotive Industries, Jan. 1995.

Let Magic Fingers Do the Driving: Wards Auto World; May 1995.

Technoid: Intelligent Brakes Are on the Way; Car and Driver, Aug. 1994.

Toyota Vehicle Stability Control System; Automotive Engineering, Aug. 1995.

Vehicle Dynamics Offers New Level of Safety: Machine Design, Sep. 1994.

Handling Control Systems For Your Car: Popular Electronics; Feb. 1995.

VDC, The Vehicle Dynamics Control System of Bosch: A. VanZanten, R. Erhardt and G. Pfaff; Robert Bosch GmbH; No. 950759, pp. 9–26.

Active Stability Control; Junichi Kubokawa, Aisin Seiki Co., Ltd., Electronics & Brake Division; Abstract; Sep. 1995.

Consideration of Lateral and Longitudinal Vehicle Stability by Function Enhanced Brake and Stability Control System; Heinz Leffler; SAE #940832; Feb. 28–Mar. 3, 1994.

Control of Vehicle Dynamics: Automotive Engineering; pp. 87–93; May 1995.

Improvement of Vehicle Maneuverability by Direct Yaw Moment Control; Y. Shibahata, K. Shimada and T. Tomari; Society of Automotive Engineers of Japan, Inc.; pp. 464–481.

Spin Control for Cars; Steven Ashley; Mechanical Engineering; pp. 66–68; Jun. 1995.

ACTIVE BRAKE CONTROL WITH FRONT-TO-REAR PROPORTIONING

TECHNICAL FIELD

This invention relates to a motor vehicle active brake control (ABC), and more particularly to a control in which front-to-rear proportioning of brake torque is preserved during operation of the active brake control.

BACKGROUND OF THE INVENTION

In most vehicles, braking is performed hydraulically, with a master cylinder developing suitably proportioned brake pressures for the front and rear wheels of the vehicle in response to driver brake pedal pressure. Alternatively, it has been proposed in U.S. Pat. No. 5,015,040, issued on May 14, 1991, assigned to the assignee of the present invention, and incorporated herein by reference, to provide brake effort proportioning with an electronic control system that brakes the wheels of one axle to achieve wheel speeds that match the corresponding wheels of the other axle. Some vehicles additionally include an active brake control (ABC) which overrides the normal braking under conditions of lateral instability to produce differential braking as between the left and right wheels of the vehicle. The differential braking induces a desired yaw moment that may be determined either open-loop (that is, in response to driver inputs, such as steering wheel angle) or closed-loop (that is, in response to a deviation between desired and measured parameters, such as yaw rate or side slip velocity). In either case, the desired yaw moment is typically considered as a desired speed differential as between the left and right wheels, and the differential braking is controlled to achieve the desired speed differential. In general, the control is carried out by isolating the brakes of the driven axle (front or rear) from the master cylinder, and then individually adjusting the those brake pressures so that one of the driven wheels is allowed to free-wheel while the other driven wheel is braked as required to achieve the desired speed differential.

While ABC can greatly enhance the handling of the vehicle, it also disturbs the normal front-to-rear proportioning of brake pressure carried out by the master cylinder. This phenomenon is especially noticeable in front-wheel-drive vehicles since the ABC reduces the overall braking effort at the front wheels, where the braking effort is usually concentrated. Typically, the driver reacts by increasing the brake pedal pressure, and the increased braking effort is provided by the un-driven wheel brakes. If the braking produces substantial wheel slip, an anti-lock brake control overrides the ABC control, at least to the extent required to stop the slipping.

SUMMARY OF THE PRESENT INVENTION

The present invention is directed to an improved active brake control for carrying out a desired wheel speed differential for enhanced vehicle handling while maintaining the normal front-to-rear brake pressure proportioning ordinarily provided by the vehicle braking system. According to the invention, during driver braking, the target speeds for the wheels of the driven axle during active brake control are determined as a combined function of the wheel speeds of the un-driven axle and the desired wheel speed differential. Specifically, the target speeds for the driven wheels are determined according to the measured speeds of the corresponding un-driven wheels, and one of the target speeds is reduced to reflect the desired wheel speed differential. If the desired wheel speed differential is designed to produce a clockwise yaw moment, the target speed for the driven wheel on the right-hand side of the vehicle is reduced; if the differential is designed to produce a counter-clockwise yaw moment, the target speed for the driven wheel on the left-hand side of the vehicle is reduced. As a result of the control, the stability enhancing effect of the ABC is achieved without disturbing the ideal front-to-rear brake effort proportioning.

DETAILED DESCRIPTION OF THE INVENTION

Figure 1:
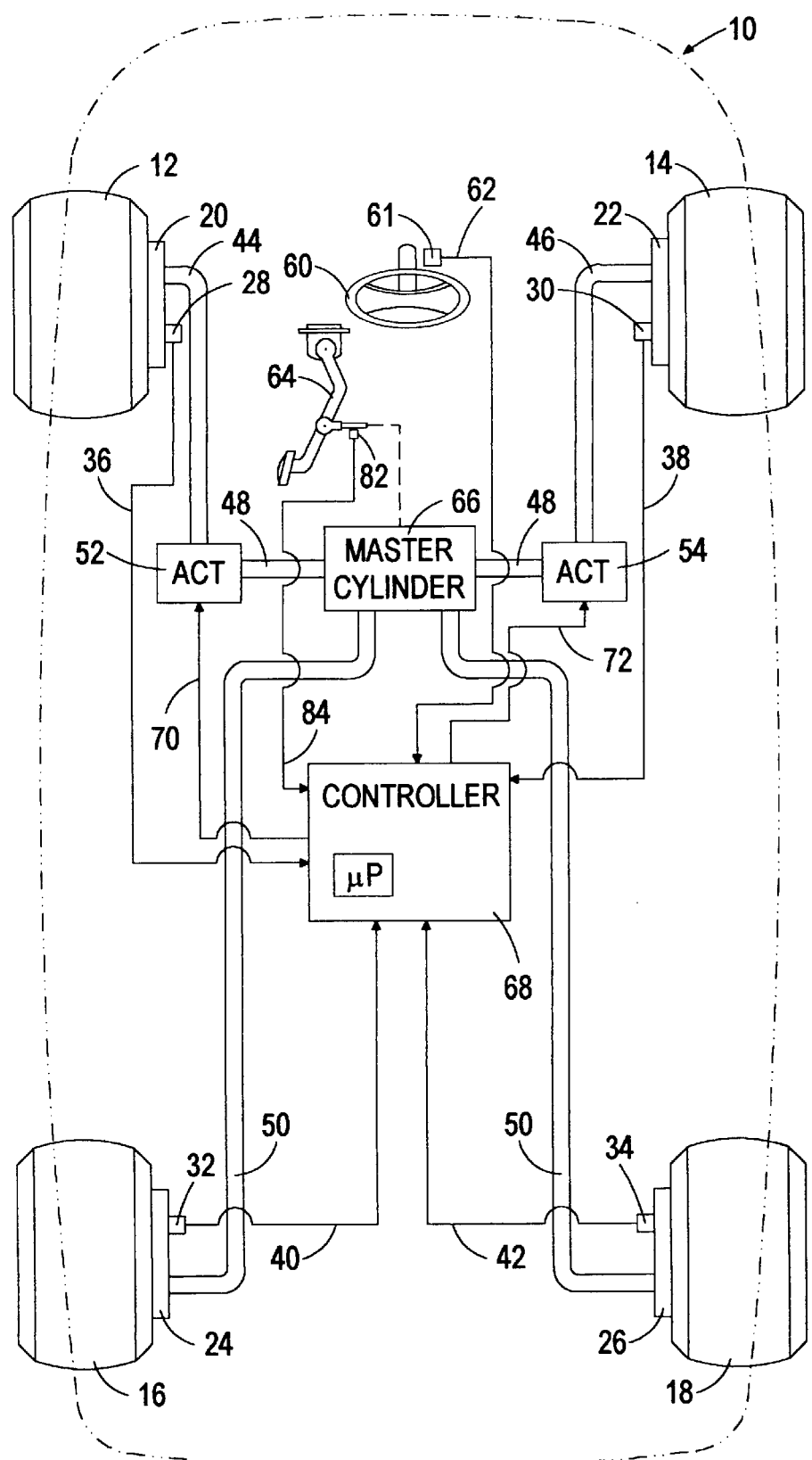
FIG. 1 is a diagram of a vehicle including an electronic controller and associated input and output devices constituting a control system for carrying out an active brake control.

FIG. 1 depicts a mechanization of an active brake control (ABC) according to this invention on a front wheel drive vehicle 10. The vehicle 10 includes a brake system including a brake pedal 64 mechanically coupled to a master cylinder 66 for producing hydraulic pressure in proportion to the force applied to pedal 64. The master cylinder 66, which may include a pneumatic booster (not shown), proportions the hydraulic pressure among the front and rear brake supply lines 48 and 50 in a conventional manner. Front supply lines 48 are coupled to the left front service brake 20 via ABC actuator 52, and to the right front service brake 22 via ABC actuator 54. Rear supply lines 50 are coupled directly to the left and right rear wheel brakes 24 and 26.

The micro-processor based controller 68 controls the operation of the ABC actuators 52, 54 via lines 70, 72 to produce differential braking of the driven wheels 12, 14 for enhancing the lateral stability of the vehicle. The controller 68 receives various inputs, including wheel speed signals on lines 36, 38, 40, 42 from respective wheel speed sensors 28, 30, 32, 34; an optional brake pedal travel signal on line 84 from pedal travel sensor 82; and a steering wheel angle signal on line 62 from angle sensor 61. The sensors 28, 30, 32, 34, 61 and 82 may be implemented with conventional devices in a manner known to those skilled in the art.

Under conditions of lateral instability, the controller 68 modifies the normal braking of one or more of the driven wheels 12, 14 via the respective actuators 52, 54 in order to produce a corrective yaw moment. Exemplary actuators are shown and described in detail in the U.S. Pat. No. 5,366,291, assigned to the assignee of the present invention. In general, however, the actuators 52, 54 operate during active brake control to isolate the respective brakes 20, 22 from the master cylinder 66, and then increase or decrease the respective brake pressures to produce a wheel speed differential corresponding to the needed corrective yaw moment. When there is no driver braking, one of the driven wheels is allowed to free-wheel, while the other driven wheel is braked as required to achieve the desired wheel speed differential. If the desired wheel speed differential is designed to produce a clockwise yaw moment, the left-hand driven wheel is allowed to free-wheel, and the target speed for the right-hand driven wheel is set to the free-wheel speed (i.e., the measured speed of the left-hand wheel) less the desired speed differential; if the differential is designed to produce a counter-clockwise yaw moment, the right-hand driven wheel is allowed to free-wheel, and the target speed for the left-hand driven wheel is set to the free-wheel speed (i.e., the measured speed of the right-hand wheel) less the desired speed differential. However, if this control is carried out during driver braking, the front-to-rear brake effort proportioning normally provided by the master cylinder is disturbed, reducing the overall braking effort of the driven wheels.

According to this invention, however, the active brake control maintains front-to-rear brake effort proportioning during driver braking by setting the target speeds of the driven wheels in relation to the measured speeds of the corresponding un-driven wheels, instead of the free-wheel speeds. If the desired wheel speed differential is designed to produce a clockwise yaw moment, the left-hand driven wheel is braked so that its speed matches the left-hand un-driven wheel, and the right-hand driven wheel is braked so that its speed matches the right-hand un-driven wheel, less the desired speed differential. If the desired speed differential is designed to produce a counter-clockwise yaw moment, the right-hand driven wheel is braked so that its speed matches the right-hand un-driven wheel, and the left-hand driven wheel is braked so that its speed matches the left-hand un-driven wheel, less the desired speed differential. As a result, the stability enhancing effect of the ABC is achieved while maintaining an ideal front-to-rear brake effort proportioning.

Figure 2:
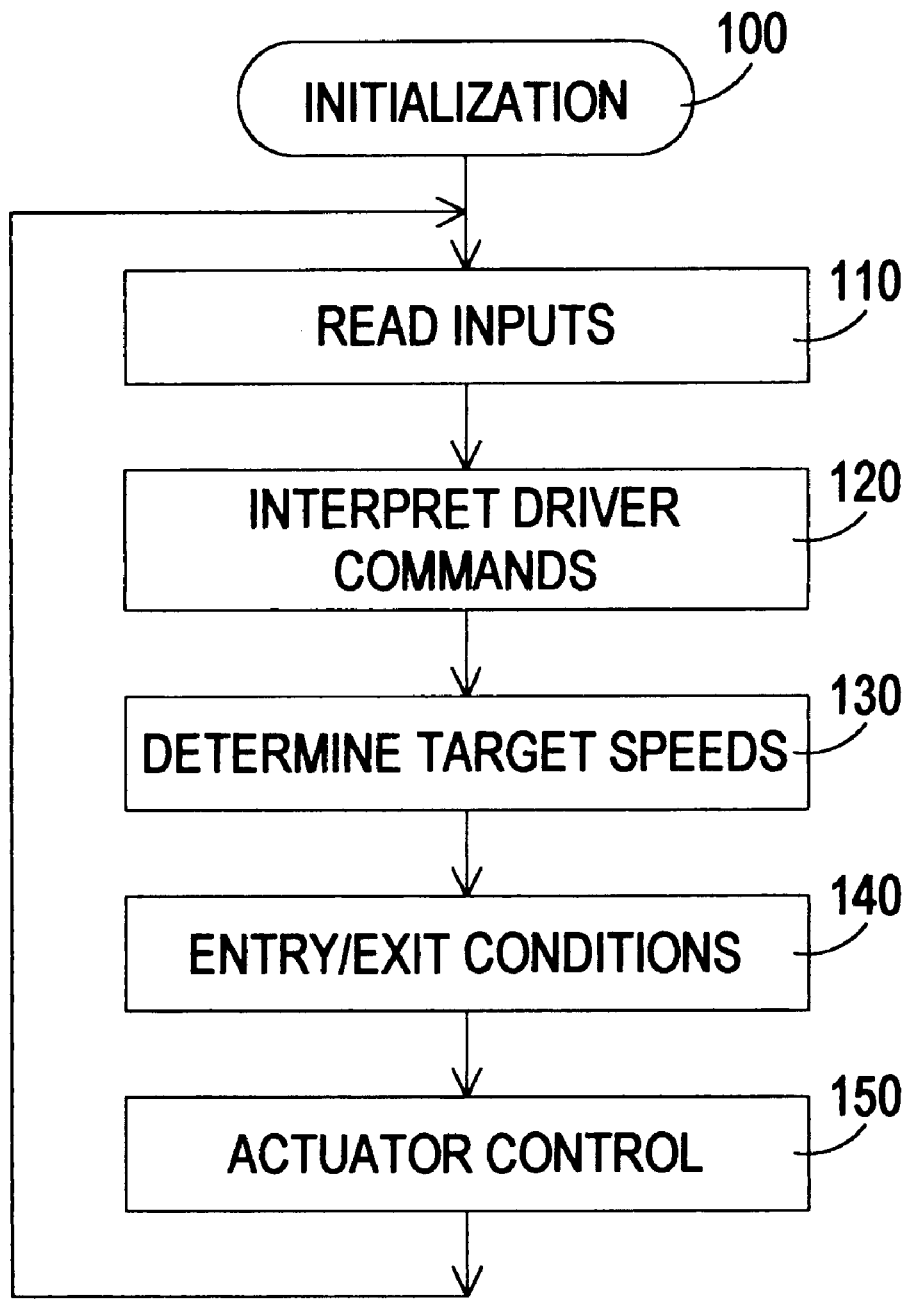
FIG. 2 is a main loop flow diagram representative of computer program instructions executed by the electronic controller of FIG. 1 in carrying out the control of this invention.

A main flow diagram for an active brake control incorporating the brake effort proportioning of this invention is set forth in FIG. 2. In the illustrated embodiment, the vehicle 10 has front-wheel drive, as discussed above, and the ABC determines the desired wheel speed differential by an open-loop technique as a function of the measured steering wheel angle δ. It will be appreciated, of course, that the disclosed configuration is somewhat arbitrary, and that the brake proportioning control is equally applicable to other configurations, such as rear-wheel-drive arrangements, and closed-loop active brake controls.

Referring to FIG. 2, the reference numeral 100 designates a series of initialization instructions executed at the initiation of vehicle operation for properly initializing certain variables and flags to initial values. Thereafter, the block 110 is executed to read the various sensor inputs, including the wheel speed signals on lines 36–42, the steering angle signal on line 62, and the brake pedal travel signal (if available) on line 84. Then the block 120 is executed to interpret the driver commands—that is, to form a desired wheel speed differential ΔV. In the illustrated embodiment, the differential ΔV is determined open-loop as a function of the measured vehicle speed $V_x$ and steering wheel angle δ, as illustrated in the flow diagram of FIG. 3.

Figure 3:
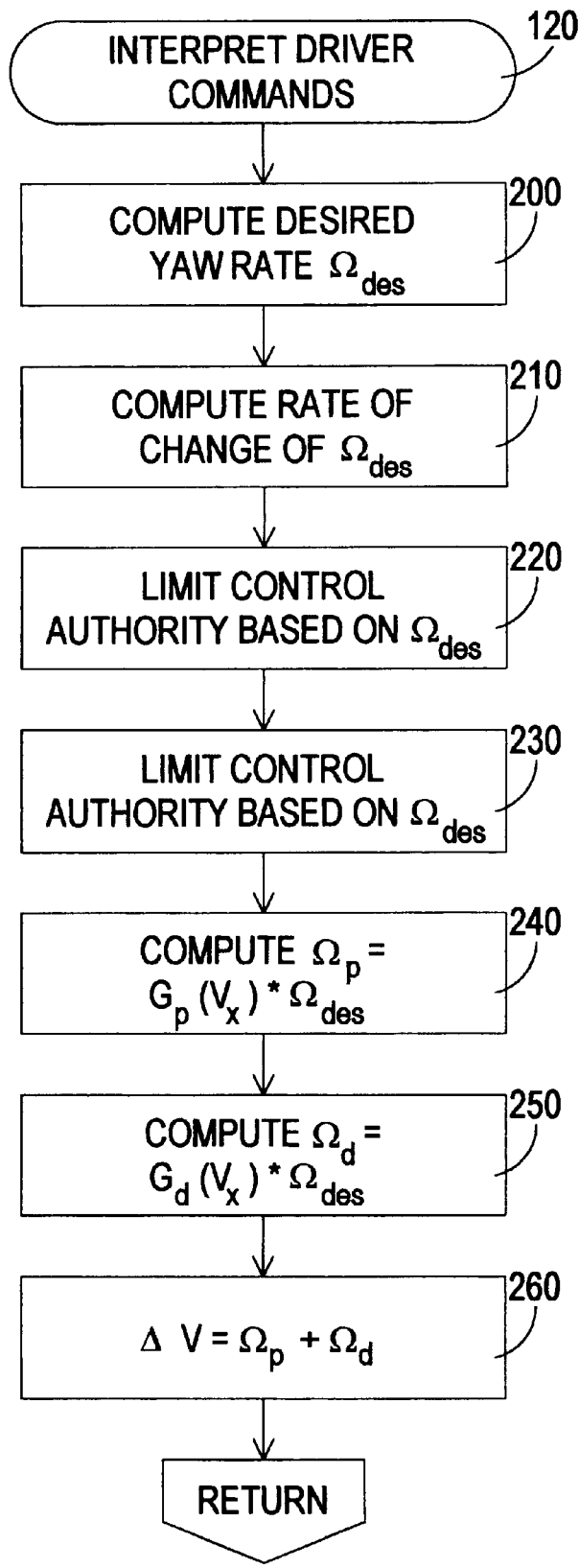
FIG. 3 is a flow diagram detailing a flow diagram block of FIG. 2 concerning the development a desired differential wheel speed for lateral stability enhancement.

Referring to FIG. 3, the block 200 is first executed to compute the desired yaw rate $\Omega_{des}$ according to the expression:

$$\Omega_{des}=V_x\delta/(L+K_uV_x^2)$$

where L is wheel base of the vehicle, and $K_u$ is an understeer coefficient. The vehicle speed $V_x$ may be derived either from the wheel speed information provided by sensors 28–34, or by another indication such as a transmission output shaft speed. Thereafter, block 210 computes the rate of change of desired yaw rate $\Omega_{des}'$ for use in determining a derivative gain term. Blocks 220–230 apply a dead-band and saturation function to the computed yaw rate and change of yaw rate to suitably limit the computed values, and blocks 240–250 then determine proportional and derivative yaw terms. Finally, the block 260 determines a desired wheel speed differential ΔV(corresponding to a desired yaw moment) by summing the proportional and derivative terms.

Figure 4:
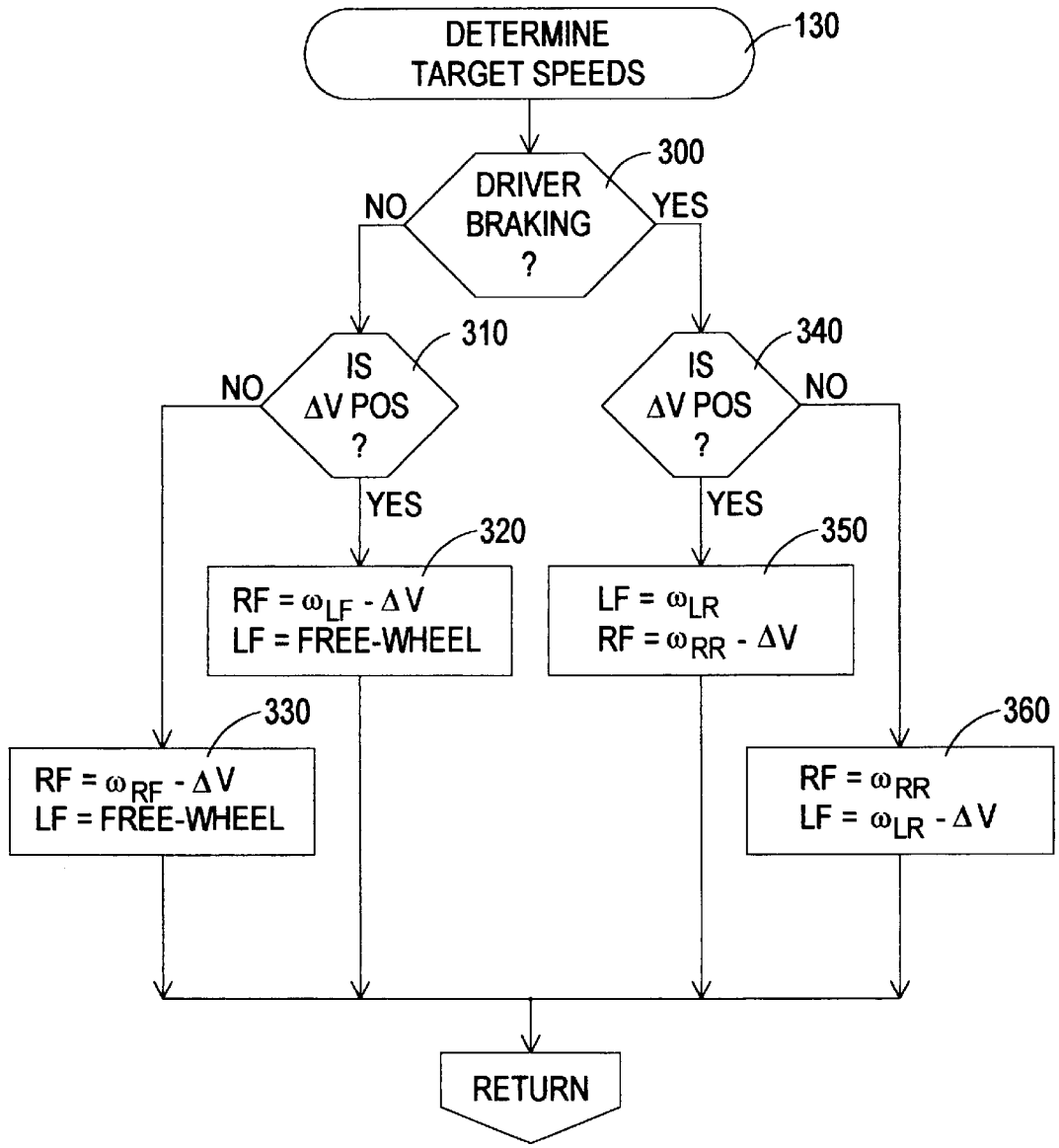
FIG. 4 is a flow diagram detailing a flow diagram block of FIG. 2 concerning the development of target speeds for the driven wheels when ABC is active.

Referring back to the main flow diagram of FIG. 2, the block 130 is then executed to determine target speeds for the driven wheels 12, 14 in accordance with this invention. This step is illustrated in further detail in the flow diagram of FIG. 4, where the block 300 is first executed to determine if the vehicle is being braked by the driver. This may be determined by the brake pedal travel sensor 82, if available; preferably however, the controller 68 may detect deceleration due to braking by computing the deceleration of the non-driven wheels based on the wheel speed signals from sensors 32–34. If the computed deceleration exceeds a threshold, driver braking is detected. If there is no driver braking (i.e., block 300 answered in the negative), block 310 is executed to determine if the differential ΔV is positive or negative. In the illustrated embodiment, a positive ΔV corresponds to a desired yaw moment in the clockwise direction, while a negative ΔV corresponds to a desired yaw moment in the counter-clockwise direction. If ΔV is positive, the left-hand driven wheel 12 is allowed to free-wheel (LF=FREEWHEEL), and block 320 sets the target speed RF for the right-hand driven wheel 14 equal to the measured free-wheeling speed $\omega_{LF}$ of wheel 12, less the differential ΔV. If ΔV is negative, the right-hand driven wheel 14 is allowed to free-wheel (RF=FREEWHEEL), and the block 330 sets the target speed LF for the left-hand driven wheel 12 equal to the free-wheeling speed $\omega_{RF}$ of wheel 14, less ΔV. Alternatively in this condition, the target speeds (RF in the block 320, and LF in block 330) may be determined in respect to the speed of the driven wheel on the same side of the vehicle, since the driven wheels are free-wheeling as well. That is, the target speed RF in block 320 could be computed as ($\omega_{RR}$–ΔV), and the target speed LF in block 330 could be computed as ($\omega_{LR}$–ΔV).

If driver braking is detected (i.e., block 300 answered in the affirmative), block 340 determines if the desired wheel speed differential ΔV is positive or negative, as described above. If ΔV is positive, block 350 sets the target speed LF for the left-front wheel 12 equal to the measured speed $\omega_{LR}$ of the left rear wheel 16, and the target speed RF for the right front wheel 14 equal to the measured speed $\omega_{RR}$ of the right rear wheel 18, less the differential ΔV. If ΔV is negative, block 360 sets the target speed LF equal to the measured speed $\omega_{LR}$ of the left rear wheel 16, less the differential ΔV, and the target speed RF equal to the measured speed $\omega_{RR}$ of the right rear wheel 18.

Referring back to the main flow diagram of FIG. 2, the block 140 is then executed to establish exit and enter conditions for active brake control. Typically, the entry conditions may involve comparing the vehicle velocity $V_x$ to a minimum velocity threshold $V_{min}$, and determining if the desired differential wheel speed ΔV exceeds a minimum value $V_{th}$. Once enabled, active brake control may be exited if, for example, the desired differential wheel speed ΔV is less than an exit threshold $V_{ex}$ for at least a predetermined period of time. For reference, another example of entry and exit conditions is given in the U.S. patent application Ser. No. 08/732,582, which is assigned to the assignee of the present invention.

If ABC is enabled, the main flow diagram block 150 is then executed to suitably control the actuators 52 and 54 for making the front wheel speeds correspond to the respective target speeds determined at block 130. This simply involves monitoring the measured speeds of the controlled wheels, increasing the respective brake pressure when a monitored speed tends to exceed or exceeds its target speed, and decreasing the respective brake pressure when the monitored speed tends to fall below or falls below its target speed. In the case of a wheel allowed to free-wheel when there is no driver braking, the target speed may be set to a very high speed so that no braking is applied. An example of such a control is described in the aforementioned U.S. Pat. No. 5,015,040, incorporated herein by reference.

In summary, then, the control of this invention provides the stability enhancing effect of the ABC while maintaining an ideal front-to-rear brake effort proportioning during driver braking. While disclosed in reference to the illustrated embodiment, it is expected that various modifications will occur to those skilled in the art, and it should be understood that controls incorporating such modifications may fall within the scope of the present invention, which is defined by the appended claims.

What is claimed is:

1. A method of operation for an active brake control on a vehicle having first and second driven wheels on first and second sides of the vehicle that are braked by the active brake control independent of driver braking effort during a detected condition of lateral instability, and first and second un-driven wheels on the first and second sides of the vehicle that are braked in proportion to driver braking effort during the condition of lateral instability, the method comprising the steps of:

determining a desired differential wheel speed for improving lateral stability of the vehicle by braking the driven wheels such that a selected one of such wheels is driven slower than the other of such wheels;

measuring the speeds of the first and second un-driven wheels;

determining a target speed for the first driven wheel based on the measured speed of the first un-driven wheel during driver braking of the vehicle;

determining a target speed for the second driven wheel based on the measured speed of the second un-driven wheel during driver braking of the vehicle;

reducing the target speed of the selected driven wheel by the desired differential wheel speed; and braking the first driven wheel to regulate a speed of such wheel at its target speed, and braking the second driven wheel to regulate a speed of such wheel at its target speed, thereby to improve the lateral stability of the vehicle while maintaining brake effort proportioning between said driven wheels and said un-driven wheels.

2. The method of operation of claim 1, including the step of:

detecting a condition of driver braking of the vehicle by using the measured speeds of the un-driven wheels to determine a deceleration value, and comparing the deceleration value to a threshold deceleration.

3. A method of operation for an active brake control on a vehicle having left and right driven wheels on left and right sides of the vehicle that are braked by the active brake control independent of driver braking effort during a detected condition of lateral instability, and left and right un-driven wheels on the left and right sides of the vehicle that are braked in proportion to driver braking effort during the condition of lateral instability, the method comprising the steps of:

determining a desired differential wheel speed for improving lateral stability of the vehicle by differentially braking the driven wheels to produce a desired clockwise or counter-clockwise yaw moment;

measuring the speeds of the left and right un-driven wheels;

determining a left target speed for the left driven wheel during driver braking of the vehicle based on the measured speed of the left un-driven wheel, less the desired differential wheel speed if a counter-clockwise yaw moment is desired;

determining a right target speed for the right driven wheel during driver braking of the vehicle based on the measured speed of the right un-driven wheel, less the desired differential wheel speed if a clockwise yaw moment is desired; and braking the left driven wheel to regulate its speed at the left target speed, and braking the right driven wheel to regulate its speed at the right target speed, thereby to improve the lateral stability of the vehicle while maintaining brake effort proportioning between said driven wheels and said un-driven wheels.

4. The method of operation of claim 3, including the step of:

detecting a condition of driver braking of the vehicle by using the measured speeds of the un-driven wheels to determine a deceleration value, and comparing the deceleration value to a threshold deceleration.

5. A method of operation for an active brake control on a vehicle having first and second driven wheels on first and second sides of the vehicle that are braked by the active brake control independent of driver braking effort during a detected condition of lateral instability, and first and second un-driven wheels on the first and second sides of the vehicle that are braked in proportion to driver braking effort during the condition of lateral instability, the method comprising the steps of:

determining a desired differential wheel speed for improving lateral stability of the vehicle by braking the driven wheels such that a selected one of such driven wheels is driven slower than the other of such wheels;

determining if driver braking is present;

if driver braking is not present, determining a first target speed for the selected one of the driven wheels based on the speed of the other of the driven wheels, and braking the selected driven wheel to regulate its speed at said first target speed;

if driver braking is present, determining a second target speed for the selected one of the driven wheels based on a speed of the un-driven wheel on the same side of the vehicle as the selected driven wheel, less the desired differential wheel speed, determining a third target speed for the other of the driven wheels based on a speed of the un-driven wheel on the same side of the vehicle as such other driven wheel, and braking the selected and other driven wheels to regulate their speeds at the second and third target speeds, respectively, thereby to improve the lateral stability of the vehicle while maintaining brake effort proportioning between said driven wheels and said un-driven wheels.

6. The method of operation of claim 5, wherein the step of determining if driver braking is present comprises:

measuring the speeds of the un-driven wheels to determine a deceleration value;

comparing the determined deceleration value to a threshold deceleration; and determining that driver braking is present if the determined deceleration value exceeds the threshold deceleration.

7. A method of operation for an active brake control on a vehicle having first and second driven wheels on first and second sides of the vehicle that are braked by the active brake control independent of driver braking effort during a detected condition of lateral instability, and first and second un-driven wheels on the first and second sides of the vehicle that are braked in proportion to driver braking effort during the condition of lateral instability, the method comprising the steps of:

determining a desired differential wheel speed for improving lateral stability of the vehicle by braking the driven wheels such that a selected one of such wheels is driven slower than the other of such wheels;

measuring the speeds of the first and second un-driven wheels;

determining a target speed for the first driven wheel based on the measured speed of the first un-driven wheel;

determining a target speed for the second driven wheel based on the measured speed of the second un-driven wheel;

reducing the target speed of the selected driven wheel by the desired differential wheel speed; and controlling the first driven wheel to regulate a speed of such wheel at its target speed, and controlling the second driven wheel to regulate a speed of such wheel at its target speed, thereby to improve the lateral stability of the vehicle.

* * * * *